United States Patent
Salmi

(10) Patent No.: US 9,268,061 B2
(45) Date of Patent: Feb. 23, 2016

(54) METHOD FOR CALIBRATING OR TESTING A DETECTOR SURFACE OF A DEVICE FOR DETECTING HYDROMETEORS AND A CALIBRATION AND TESTING DEVICE

(75) Inventor: Atte Salmi, Porvoo (FI)

(73) Assignee: VAISALA OYJ, Helsinki (FI)

( * ) Notice: Subject to any disclaimer, the term of this patent is extended or adjusted under 35 U.S.C. 154(b) by 549 days.

(21) Appl. No.: 13/577,177

(22) PCT Filed: Feb. 22, 2010

(86) PCT No.: PCT/FI2010/050119
§ 371 (c)(1),
(2), (4) Date: Oct. 4, 2012

(87) PCT Pub. No.: WO2011/101528
PCT Pub. Date: Aug. 25, 2011

(65) Prior Publication Data
US 2013/0014556 A1    Jan. 17, 2013

(51) Int. Cl.
*G01W 1/18* (2006.01)
*G01L 5/00* (2006.01)
*G01W 1/14* (2006.01)

(52) U.S. Cl.
CPC .............. *G01W 1/18* (2013.01); *G01L 5/0052* (2013.01); *G01W 1/14* (2013.01)

(58) Field of Classification Search
CPC ......... G01W 1/14; G01W 1/18; G01L 5/0052
See application file for complete search history.

(56) References Cited

U.S. PATENT DOCUMENTS

| 4,184,768 A | 1/1980 | Murphy et al. |
| 2003/0156268 A1* | 8/2003 | Nagasaka et al. ............... 355/69 |
| 2009/0213883 A1* | 8/2009 | Mazur et al. .................... 372/25 |
| 2009/0245302 A1* | 10/2009 | Baird et al. ..................... 372/25 |

FOREIGN PATENT DOCUMENTS

| JP | 2002-040528 A | 2/2002 |
| JP | 2007-520689 A | 7/2007 |

OTHER PUBLICATIONS

C.B. Scruby et al., "A Laser-Generated Standard Acoustic Source" Materials Evaluation, vol. 39, Dec. 1981, pp. 1250-1254.*
Hietanen et al., "Photoacoustic Testing of Ultrasonic Air Transducers", Measurement Science and Technology, Jan. 1994, vol. 5, No. 8, pp. 960-963.
Kourtellis et al., "Disdrometer Calibration Using an Adaptive Signal Processing Algorithm", Oceans 2005, Proceedings of MTS/IEEE, 2005, vol. 3, pp. 2572-2577.

(Continued)

*Primary Examiner* — Paul West
(74) *Attorney, Agent, or Firm* — Birch, Stewart, Kolasch & Birch, LLP

(57) ABSTRACT

The invention relates to a method and device for calibrating or testing the detector surface (10) of a measuring device (1) detecting hydrometeors. According to the method, impulses are focussed on the detector surface (10) in a controlled manner, the responses caused by the impulses, detected by the detector of the measuring device (1), are measured, the measurement values of the responses are compared with the target values and the required corrections to the settings of the measuring device (1) are analyzed, and the measuring device (1) is adjusted on the basis of the analysis. According to the invention, an electromagnetic radiation pulse (70) of short duration is focussed on the detector surface (10), whereby this causes a thermal-expansion reaction in the detector surface (10), detected by the detector.

19 Claims, 5 Drawing Sheets

(56) References Cited

OTHER PUBLICATIONS

Rabasovic et al., "Pulsed Photoacoustic System Calibration for Highly Excited Molecules", Measurement Science and Technology, Jan. 2006, vol. 17, No. 7, pp. 1826-1837.

Salmi, "Piezoelectric Precipitation Sensor From Vaisala", Slide presentation in WMO Technical Conference on Meteorological and Environmental Instruments and Methods of Observation(TECO-2005), 2005, pp. 7, 28.

* cited by examiner

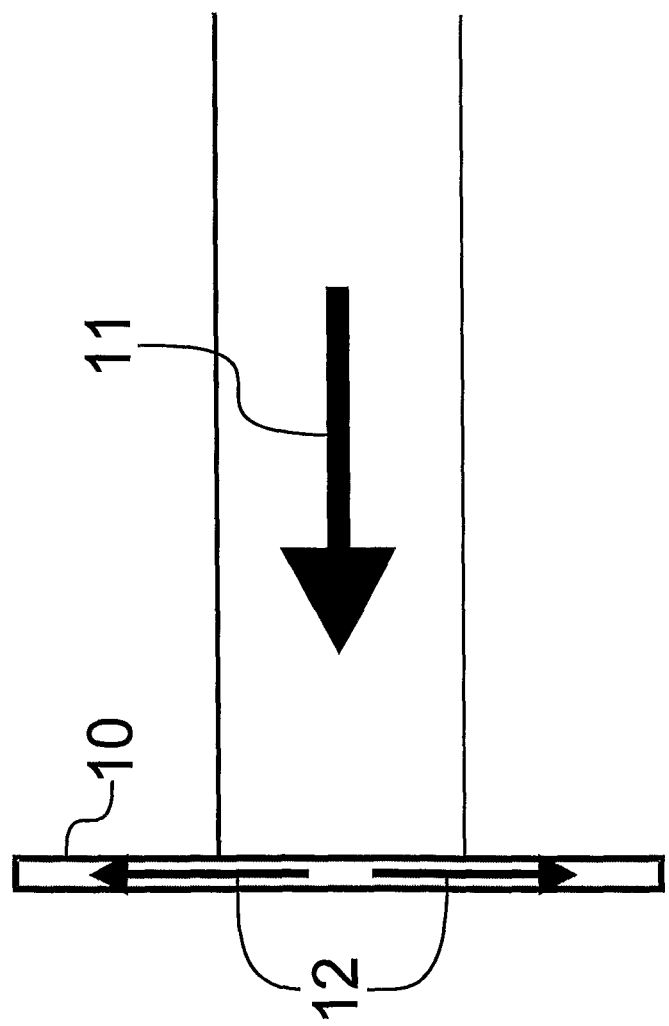

METHOD FOR CALIBRATING OR TESTING A DETECTOR SURFACE OF A DEVICE FOR DETECTING HYDROMETEORS AND A CALIBRATION AND TESTING DEVICE

The present invention relates to a calibration or testing method, according to the preamble of claim 1, in connection with a measuring device detecting hydrometeors.

The invention also relates to a calibration or testing apparatus, according to Claim 10, for a sensor detecting hydrometeors.

The solution to which the invention relates concerns sensors measuring water in its various forms (particularly water and hailstones), which sensors are based on detecting the mechanical impulses created when hydrometeors strike a detector surface. The information produced by the sensor can be the amount of precipitation, the intensity of precipitation, precipitation type, the droplet size distribution, the kinetic energy of the precipitation, or some other variable that can be calculated from the impulses created by the hydrometeors. A sensor and method detecting immediately hydrometeors striking a detector surface are disclosed in, for example, the applicant's earlier Finnish patent 116424.

According to the prior art, the detector surface of a measuring device is calibrated using mechanical methods, in other words by directing a standard impulse with the aid of a standard-size ball or a lever striker. These mechanical solutions are unreliable and subject to errors.

The invention is based on replacing the mechanical impact effect with an electromagnetic pulse of short duration and high intensity.

According to one preferred embodiment of the invention, the electromagnetic pulse is a laser pulse.

More specifically, the method according to the invention for calibrating the detector surface of a measuring device detecting hydrometeors is characterized by what is stated in the characterizing portion of Claim 1.

For its part, the calibration apparatus according to the invention is characterized by what is stated in the characterizing portion of Claim 10.

Considerable advantages are gained with the aid of the invention.

In the following, the invention is examined with the aid of examples and with reference to the accompanying drawings.

FIG. 3 shows the stresses experienced by the detector surface of the measuring device, which are caused by thermal expansions created by a radiation pulse.

The following is a list of the reference numbers used and their related terms:

| No. | Component |
|---|---|
| 1 | measuring device |
| 2 | electronics |
| 3 | detector |
| 4 | algorithm |
| 5 | signal |
| 10 | detector surface |
| 11 | laser pulse |
| 12 | stress |
| 40 | lens |
| 41 | prism |
| 42 | energy meter |
| 43 | pulse laser |
| 44 | computer, in which there is a data-collection card and an analysis program |
| 45 | oscilloscope |
| 46 | parking level |
| 47 | safety cabinet |
| 50 | power and cooling system |

Figure 2:
FIG. 2 shows a calibrating measuring device according to the invention, differing from that shown in FIG. 1.
Figure 1:
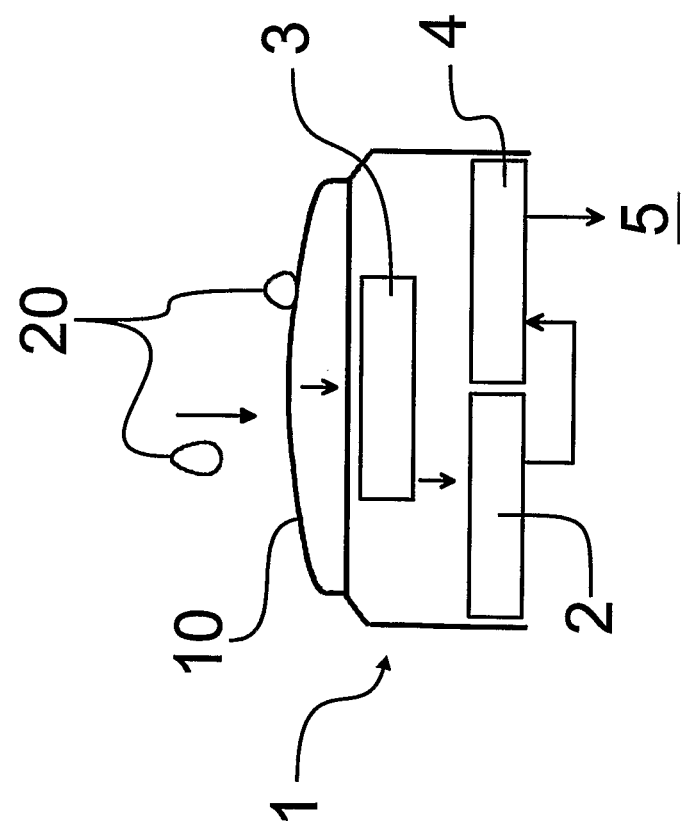
FIG. 1 shows a calibrating measuring device according to the invention.

As can be seen from FIGS. 1 and 2, the measuring device 1 comprises a detector surface 10 intended to measure hydrometeors 20, such as water and hailstones. The construction and operation of such a measuring device are described in detail in publication FI 116424. When hydrometeors 20 strike the detector surface 10 they induce pulses, which are detected by the detector 3 of the measuring device. On the basis of the pulse data of the detector, the measuring electronics 2 and the calculation algorithm 4 calculate the precipitation intensity and the cumulative amount of precipitation. In this connection, the precipitation intensity refers to the accumulation of precipitation per unit of time (mm/h) and the cumulative amount of precipitation refers to the vertical depth of water on a flat surface (mm). The result is an electric signal 5 obtained from the measuring device 1, which depicts the variables being measured and which in practice is created in real time.

The detector surface 10 receiving the precipitation is rigid and attached to the device body of the measuring device. The attachment can be fully rigid or implemented with the aid of an O-ring, or a corresponding flexible connection piece. The detector 3 is typically fixed to the detector surface 10. Calculation takes place by utilizing information on the number of pulses registered, or on some droplet-size-dependent feature of the pulse, such as amplitude or half-band width, or on a combination of these. The detector surface 10 is planar, discoid, or domed (a cap surface) and shaped in such a way that water does not collect on its surface. The larger the surface area of the detector 10, the more droplets 20 will strike it and the smaller will be the statistical error of the calculated amount of precipitation. On the other hand, when the area of the detector surface 10 increases, more strikes will take place, so that the pulses will overlap each other, which will make it more difficult to interpret the results. In practice, a suitable size for the detector 10 has been shown to be 20-150 cm$^2$. The detector 10 can also consist of several parts, to each of which is attached its own detector 3, which measures the deformation of the detector surface 10 caused by the droplets 20. As the detector 3, it is possible to use, for instance, force and acceleration sensors attached to the detector surface 10, a pressure-sensitive membrane, such as a piezoelectric PVDF plastic membrane, on the detector surface, or a ceramic piezoelectric membrane. Ideally, the response of the detector-surface-detector-system will be such that the amplitude and shape of the pulse will not depend on the location of the impact of the droplet 20, that is the detector surface will be homogeneous. However, this is not essential, because an inhomogeneous response will cause only a random error in the measurement, which can be reduced by using an integration time of sufficient length. Generally, the detector 3, however, must be such that the information obtained from the loading detected by it on the detector surface can be transmitted mechanically for analysis. Thus, it is precisely piezoelectric membranes as well as force and acceleration sensors that are preferable in this sense. For example, in the case of a piezo-element, its electrodes can be connected to an electronic amplifier, which is located inside the detector casing. When a raindrop 20 or other hydrometeor strikes the detector surface 10, a force acts on it, which is forwarded to the piezoelectric element 3 and the voltage pulse induced over it is detected. The amplified measurement signal 5, in this case a voltage pulse, can be forwarded for further processing, for example, over a cable running through the bottom of the detector casing.

As can be seen from FIG. 3, when a short laser pulse 11 of high energy is directed to the detector surface 10, it will induce, through rapid thermal expansion, a mechanical impulse 12, the magnitude of which can be measured by the detector surface's piezo-sensor.

Figure 4:
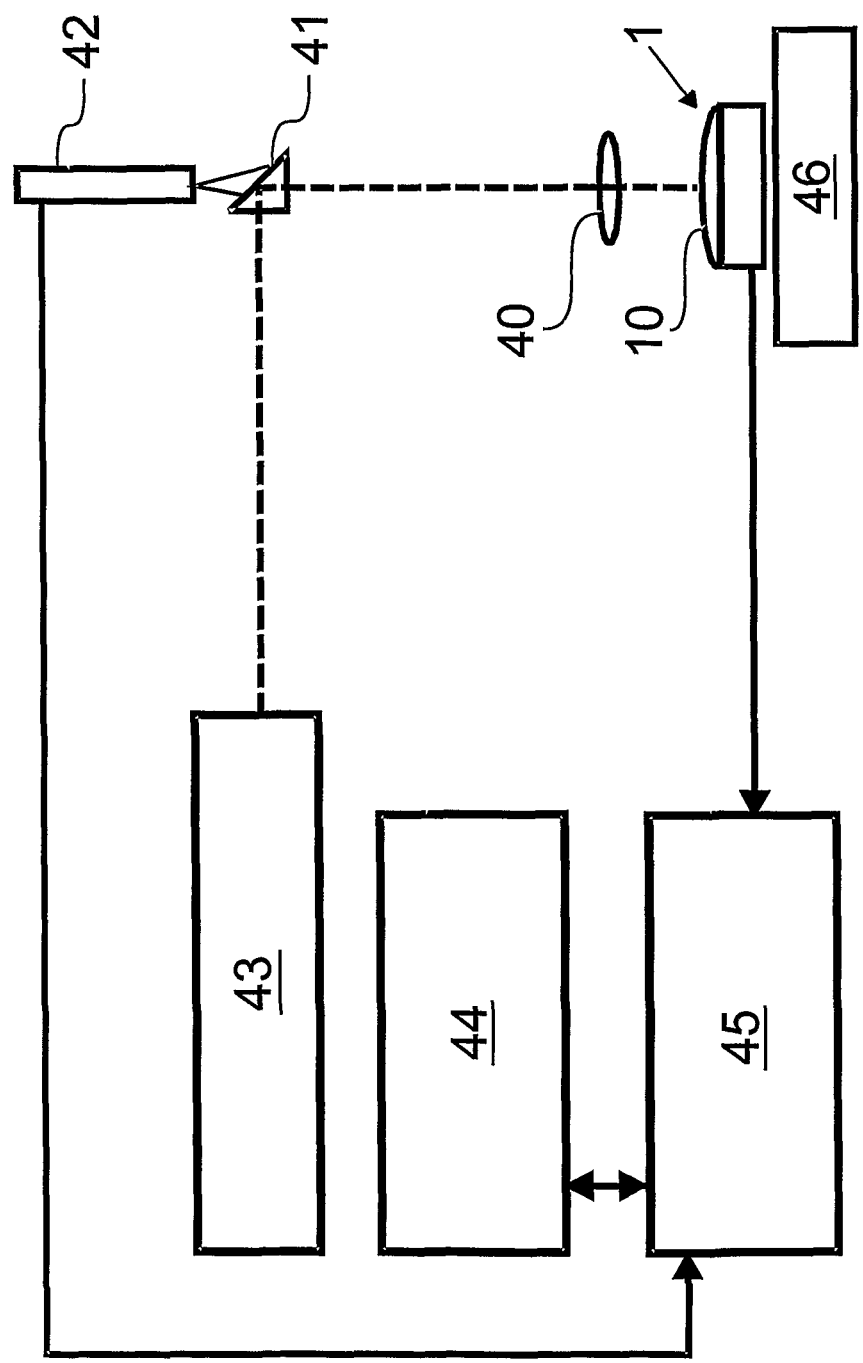
FIG. 4 shows a calibration device according to one embodiment of the invention.

As can be seen from FIG. 4, the calibration apparatus according to the invention comprises means for directing impulses to the device to be calibrated and means for measuring the response caused by this. According to one embodiment, the calibration apparatus contains a remotely controlled pulse-laser 43 for producing impulses, by means of which the desired pulses of electromagnetic radiation can be produced, and means for focussing the radiation. [A suitable laser source can be, for example, an Nd Yag-type pulse laser, with a wavelength of 1064 nm, a pulse duration of app. 5 ns, and a pulse energy of app. 400 mJ. Many laser apparatuses of this kind are abundantly available commercially. The laser point must be selected to have a power density such that the beam will not damage the detector surface.

The pulse laser 43 is arranged to transmit radiation, i.e. laser beams to the measuring device 1 to be calibrated, particularly to its detector surface 10, with the aid of focussing means. Such focussing means can be, for example, a prism 41, which is arranged to direct the radiation arriving from the pulse laser 43 towards the measuring device 1. According to one embodiment, a lens 40, which focuses the radiation of the pulse laser 43 onto the detector surface 10 of the measuring device 1, is fitted between the prism 41 and the measuring device 1. In addition, the measuring device 1 is preferably fitted on top of a separate parking level 46, on which level the measuring device 1 can be moved precisely, in order to irradiate a specific point. The parking level 46 is preferably a so-called X-Y plane, which can be moved horizontally in two directions.

Thus, the calibration apparatus also comprises means for measuring the response of the measuring device 1. According to one embodiment, the means for measuring the response comprise an energy meter 42 and an oscilloscope 45 connected to it, which is in turn connected to a computer 44. The energy meter 42 is arranged to measure the radiation transmitted by the pulse laser 43 with the aid of the prism 41, as shown in FIG. 4. If necessary, the energy meter 42 can also be used to send a trigger signal to the oscilloscope 45, on the basis of the radiation it detects. On the other hand, the oscilloscope 45 is connected to the measuring device 1, from which it is arranged to receive the measuring information caused by the radiation of the pulse laser 43. The oscilloscope measures the measurement information of the measuring device 1, which it links, if necessary, to the trigger signal of the energy meter 42. Finally, the oscilloscope 45 transmits the measurement result assigned to the trigger signal, i.e. to a specific impulse, to the computer 44, in which the measurement results are analysed. The computer 44 is equipped with a signal processing program, such as the LabVIEW program, for analysing a measurement signal. Instead of an oscilloscope 45, block 45 can be any data-processing unit whatever, which forms a combination signal from a trigger pulse and its response from the measuring device 1. Because the laser 43 can produce more or less constant-magnitude pulses and, in addition, their intensity can be determined using the device 45, the measuring device 1 can be calibrated on the basis of the response received from it.

According to one embodiment of the invention, the laser-energy-meter 42 controls the energy level of the laser pulse and, if necessary, sends an alarm if the pulse energy moves outside the set limits. A high-precision energy meter 42 can also be used for the real-time calibration of the impulse caused by the laser pulse. This takes place by forming the quotient between the measured energy of the laser pulse and the so-called reference-pulse energy. The quotient is used as a calibration coefficient for the impulse received by the sensor. For example, if the desired reference-pulse energy were to be 400 mJ and this were to drop to a level of 300 mJ, the impulse detected by the sensor will be corrected by the factor 4/3. Other calibration models can also be used in place of the linear calibration described above.

Figure 5:
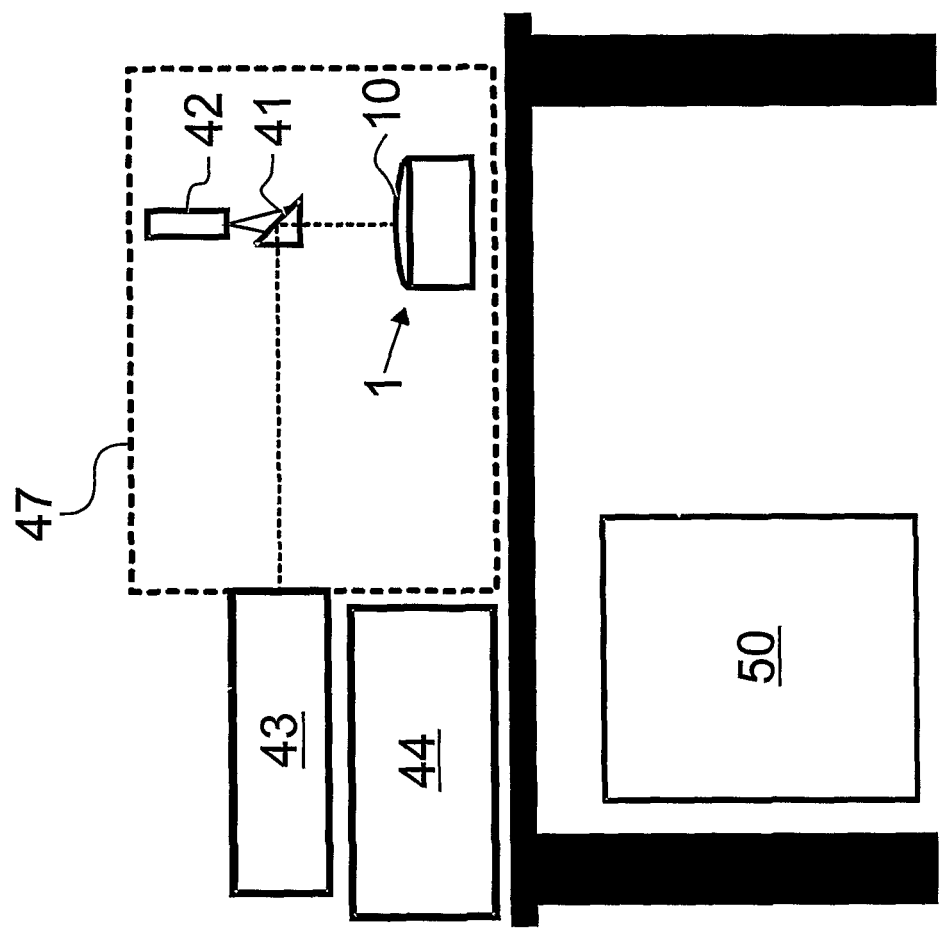
FIG. 5 shows a calibration device according to a second embodiment of the invention.

According to one embodiment, the means for focussing impulses on the measuring device 1 to be calibrated are encased in a safety cabinet 47 (FIG. 5). The safety cabinet 47 is preferably such that it will prevent a high-power laser pulse from escaping into the environment. The safety cabinet 47 is arranged to enclose inside it the radiation to be focussed on the measuring device 1, in order to protect people working in the calibration room. Thus, the safety cabinet 47 encloses the laser energy meter 42, the prism 41, and the actual measuring device 1.

According to one embodiment, the calibration apparatus is equipped with a power and cooling system 50, which cools the power components.

Figure 6:
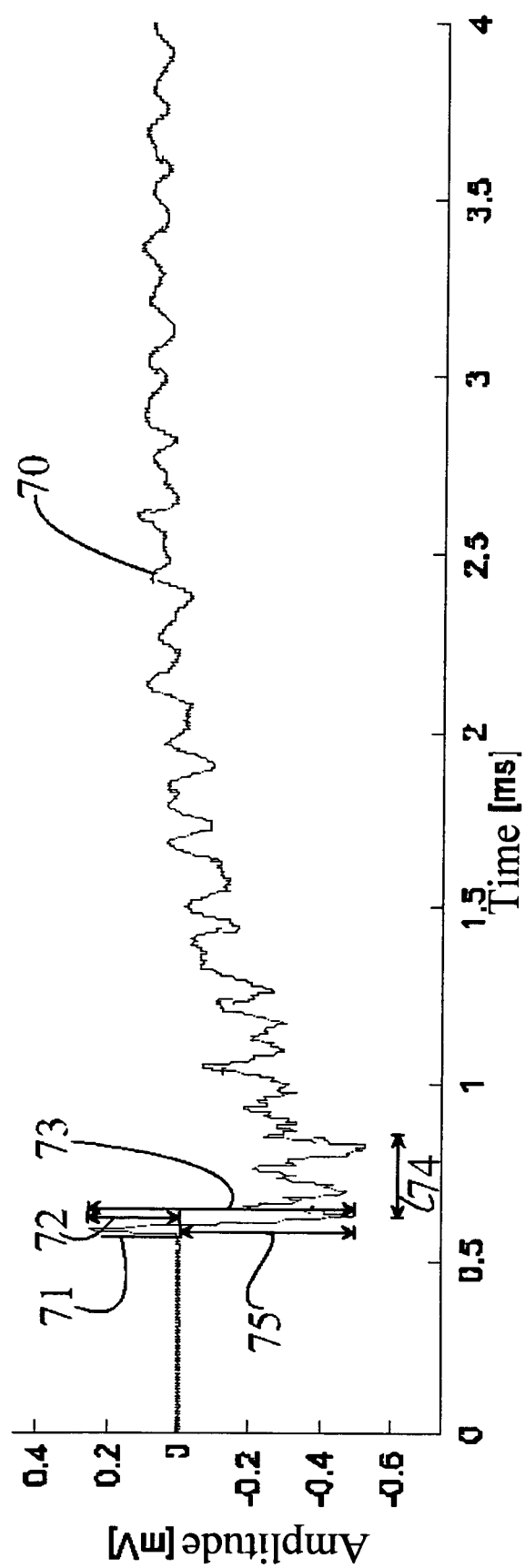
FIG. 6 shows graphically one measurement signal according to the invention.

According to FIG. 6, the laser trigger 71 causes a signal 70 in the measuring device 1, from which, for calibration or test purposes, are measured, for example, a positive 72 or negative response 75, a peak-to-peak value 73, or alternatively the mean value of a time window 74, a nominal value, or a frequency response.

The invention claimed is:

1. A method for calibrating or testing a detector surface of a measuring device detecting hydrometeors, comprising the steps of:
focusing impulses on the detector surface in a controlled manner;
detecting responses caused by the impulses by a detector of the measuring device;
measuring the detected responses by a measuring mechanism to obtain measurement values, wherein the measuring mechanism includes a processing unit connected to the measuring device and configured to receive the detected responses from the detector of the measuring device, and an energy meter configured to measure the impulses transmitted from the radiation source before arriving at the detector surface and generate a signal to the processing unit based on the measurement;
comparing the detected responses received from the detector with the signal received from the energy meter to obtain a calibration coefficient;
analysing required corrections to settings of the measuring device based on the calibration coefficient, and
calibrating the detector surface of the measuring device by adjusting the settings of the measuring device on the basis of the analysis, wherein the impulses are electromagnetic radiation pulses of short duration transmitted from a radiation source to the detector surface, and the responses detected by the detector are thermal-expansion reactions.

2. The method according to claim 1, wherein the radiation is coherent radiation.

3. The method according to claim 1, wherein the radiation is coherent laser radiation.

4. The method according to claim 1, wherein the radiation is focussed on the detector surface by means of a lens.

5. The method according to claim 1, wherein the radiation is directed towards the detector surface by means of a prism.

6. The method according to claim 1, wherein the energy meter comprises a photodetector.

7. The method according to claim 1, wherein the measurement results are analysed using a computer, which is connected to a telecommunications link with the measuring mechanism.

8. The method according to claim 1, wherein the measuring device is attached to a movable parking level and is parked to receive radiation by moving the parking level.

9. The method according to claim 1, further comprising the step of using the measurement obtained from the energy meter to increase the precision of the testing or calibration.

10. A calibration or testing device, comprises:
a radiation source configured to transmit a high-energy electromagnetic pulse of short duration;
a focusing device configured to focus the high-energy electromagnetic pulse on a detector surface of a measuring device to be calibrated;
a measuring mechanism configured to measure responses of the high-energy electromagnetic pulse detected by a detector of the measuring device;
wherein the measuring mechanism includes a processing unit connected to the measuring device and configured to receive the detected responses from the detector of the measuring device, and an energy meter configured to measure the high-energy electromagnetic pulse transmitted from the radiation source before arriving at the detector surface and generate a signal to the processing unit based on the measurement, and
wherein the processing unit is configured to perform an analysis by comparing the detected responses received from the detector with the signal received from the energy meter to obtain a calibration coefficient; and calibrate the detector surface of the measuring device by modifying the settings of the measuring device based on the calibration coefficient.

11. The calibration or testing device according to claim 10, wherein the radiation source is a laser.

12. The calibration or testing device according to claim 10, wherein the focusing device comprises a prism for directing the radiation.

13. The calibration or testing device according to claim 10, wherein the focusing device comprises a lens for focussing the radiation on the object.

14. The calibration or testing device according to claim 10, wherein the processing unit comprises an oscilloscope.

15. The calibration or testing device according to claim 10, wherein the energy meter comprises a photodetector.

16. The calibration or testing device according to claim 15, wherein the focusing device comprises a prism for directing the radiation, and the photodetector is arranged to receive the radiation of the radiation source from the prism.

17. The calibration or testing device according to claim 10, further comprising a computer arranged in a telecommunications link with the measuring mechanism, and equipped with a computer program arranged to analyse the measurement results of the measuring mechanism.

18. The calibration or testing device according to claim 10, further comprising a parking level, on which the measuring device to be calibrated is installed, the parking level being arranged to move in at least two degrees of freedom, in order to park the measuring device to receive radiation.

19. The calibration or testing device according to claim 10, wherein the calibration or testing device is configured to increase the precision of testing or calibration by using the measurement obtained from the energy meter.

* * * * *